United States Patent Office 3,625,672
Patented Dec. 7, 1971

---

3,625,672
METHOD FOR PREPARING AMMONIATED WET PROCESS SUPERPHOSPHORIC ACID BASE SOLUTION
Wendell D. Burch and Donald L. Whitfill, Ponca City, Okla., assignors to Continental Oil Company, Ponca City, Okla.
No Drawing. Filed Feb. 10, 1969, Ser. No. 798,153
Int. Cl. C05b 11/06
U.S. Cl. 71—35                               1 Claim

ABSTRACT OF THE DISCLOSURE

Precipitation of magnesium impurity in fertilizer base solution prepared from wet process superphosphoric acid is reduced by adjusting the pH of the solution to within the range of about 6.0 to 6.2 by ammoniation, and then adding concentrated nitric acid to attain a pH in the range of about 5.0 to about 5.6.

---

This invention relates to an improved fertilizer base solution. In one aspect, the invention relates to a method for preparing fertilizer base solution from wet process phosphoric acid having improved magnesium impurity precipitation properties.

Fertilizer base solutions, and liquid mixed fertilizers, derived from wet process phosphoric acid exhibit a tendency to precipitate various salts during storage. Of these salts, magnesium is one of the most troublesome in that the precipitation period is quite variable, depending on magnesium concentration, storage temperature, and presence or absence of seeding. Further, ammoniation of such phosphoric acid to a degree sufficient to obtain a fertilizer solution analyzing 10 or more percent nitrogen generally results in a product which cannot be stored at low temperature, i.e. it salts out at about 32° F.

It is an object of this invention to provide a fertilizer base solution in which magnesium precipitation is minimized.

Other aspects, objects, and the several advantages of this invention will become apparent upon study of the disclosure and appended claim.

We have discovered that fertilizer base solutions having improved magnesium precipation properties can be prepared by adjusting the pH of the solution to within the range 5.0 to 5.6. We have further discovered that base solutions having the desired high analysis can be derived from wet process superphosphoric acid via either of two routes, viz the superphosphoric acid can be ammoniated to within the aforementioned pH range and then fortified to obtain the desired nitrogen analysis by addition of e.g. urea or ammonium nitrate, or the superphosphoric acid can be ammoniated to within the conventional pH range of about 6.0–6.2 followed by adjusting the pH to within the range of the present invention by addition of nitric acid.

Furnace grade phosphoric acid does not exhibit the problem of magnesium precipitation when converted to fertilizer base solutions. Therefore, our invention is necessary only for fertilizer solutions made from wet process superphosphoric acid containing a relatively high magnesium impurity level, although practice of our invention on solutions derived from furnace acid is not harmful to the product.

By fertilizer base solution is generally meant the ammoniation product of phosphoric acid. In order to achieve all the economies and advantages attendant with the use of such liquids, it is desirable that they be prepared in as highly concentrated form as is consistent with handling, precipitation, and salting out temperature properties. Standard analyses of such solutions have been 10-34-0 and 11-37-0, with even more concentrated grades such as 12-40-0 and greater having been prepared. Such base solutions are often blended, e.g. with a potassium salt, prior to sale.

Fertilizer base solutions of the type contemplated herein are prepared by ammoniation of wet process superphosphoric acid, which is a phosphoric acid containing both ortho- and polyphosphoric acids; for purposes of this invention, the superphosphoric acid preferably contains at least about 68 weight percent $P_2O_5$, and is generally prepared by evaporating water from conventional merchant grade wet process orthophosphoric acid. Ammoniation can be effected with liquid or gaseous anhydrous ammonia, ammonium hydroxide solution, or a combination of these materials.

Solutions can be prepared according to the present invention by either of two methods. According to the first, superphosphoric acid is ammoniated to within the pH range of the present invention, viz about 5.0 to about 5.6. The resulting solution will be low in nitrogen analysis, which is supplied by dissolving therein urea, ammonium nitrate, or solutions thereof to obtain the final desired nitrogen analysis; the product should be maintained within the noted pH range. According to the second method, superphosphoric acid is ammoniated to within the pH range conventional in the prior art, e.g. about 6.0–6.2, and the solution pH is then adjusted to within the range of the present invention by addition of concentrated nitric acid.

The process and composition of the present invention exhibit several advantages. Not only is precipitation of magnesium impurity during storage inhibited, but also the solution corrosivity toward aluminum or mild steel storage vessels is reduced, and the high analysis products are stable at low temperature storage.

Prior to practice of this invention, fertilizer base solutions, which typically contain a magnesium impurity level of about 0.2–0.3 weight percent, begin to precipitate magnesium in about 4 to 6 weeks at 75° F. storage, in about two weeks at 100° F. storage, and in about a week if "seeded" e.g. with $Mg(NH_4)_2P_2O_7 \cdot 4H_2O$ and stored at 100° F. When solutions are prepared according to the present invention, magnesium precipitation is generally completely prevented, although in the case of solutions having a high $MgO/P_2O_5$ level, some slight but greatly reduced precipitation can occur. The reduction or elimination of magnesium precipitation removes the necessity for long storage periods followed by filtration, decanting or centrifuging to obtain an acceptable solution product, and of course the inventive method is quite simple. We are aware of U.S. Pat. 2,950,961 to Striplin et al., issued Aug. 30, 1960, which discloses a fertilizer base solution having a final pH in the range 5.0–6.65 to minimize corrosion, but note that our narrower range is critical for control of magnesium precipitation.

The invention will now be further explained by reference to the following examples, which are illustrative and not limiting.

EXAMPLE 1

A base solution was prepared by ammoniating superphosphoric acid at a pH of 6 until the formulation was nearly complete. Superphosphoric acid was then added to lower the pH to 4.3. The solution analyzed 7.6–34.7–0. This solution was stored without seeding at 100° F. for 75 days without precipitation of magnesium. The test was terminated at this point due to hydrolysis of the solution at this low a pH with subsequent formation of a "gel."

EXAMPLE 2

A base solution was made by ammoniating superphosphoric acid to a pH of 6.45. Concentrated nitric acid was then added to the solution to lower the pH to 6.1. This solution had an analysis of 10.7–34.6–0. A sample of this solution that was not seeded was stored at 100° F. A precipitate formed in about two weeks.

EXAMPLE 3

A base solution was made by ammoniating superphosphoric acid to a pH of 6.2. The analysis of this solution was 10.2–37.3–0. Sufficient concentrated nitric acid was added to a portion of this solution to lower the pH to 5.9. The analysis of this solution was 10.4–36–0. An unseeded sample developed a magnesium precipitate after three weeks storage at 100° F. Sufficient concentrated nitric acid was added to another portion of the solution to lower the pH to 5.6. The analysis of this sample was 10.6–34–0. An unseeded sample of this solution was stored at 100° F. for four months without formation of a magnesium precipitate.

EXAMPLE 4

A base solution was prepared by ammoniation of super phosphoric acid to a pH of 5.5 UN 32 solution (water solution of urea and ammonium nitrate analyzing about 32 weight percent nitrogen) was added (1.7% by wt.) to the sample. A seeded sample stored at 100° F. had not precipitated after nine weeks of storage. The analysis of the sample was 9.8–36.1–0.

EXAMPLE 5

A sample was prepared by ammoniating super phosphoric acid to a pH of 5.0 and then adding 6.25% UN 32 solution. The analysis of the sample was 10.0–34.7–0. A seeded sample stored at 100° F. had not precipitated after five weeks of storage.

Examples 2 and 3 indicate clearly that low pH, and not nitrate addition, is the cause of delay in precipitation of magnesium.

EXAMPLE 6

In this example, two samples of different super-phosphoric acid were ammoniated to the noted pH values.

TABLE 1

Relative Amount of Magnesium That Precipitates at Different pH Levels

| pH: | Relative Amount of magnesium [1] | |
|---|---|---|
| | Sample 1 | Sample 2 |
| 6.0 | 100.0 | 100.0 |
| 5.9 | 96.0 | |
| 5.8 | 95.2 | 79.0 |
| 5.7 | 50.4 | 76.5 |
| 5.6 | 21.6 | 74.1 |
| 5.5 | 2.4 | 25.9 |

[1] The amount of magnesium precipitate at a pH of 6.0 is assigned a value of 100.0. The others are compared to this as a standard.

EXAMPLE 7

Excess magnesium precipitate, 10% by weight, was added to two base solutions at the noted pH values, and stirred for several hours. At the higher pH level this seeding technique removed magnesium by precipitation, but at the lower pH, the solution was able to dissolve the magnesium.

TABLE 2

Magnesium Concentration In Weight Percent Percent Over a Time Lapse of Seven Hours

| Time lapse | pH=5.5 | pH=6.2 |
|---|---|---|
| Original | 0.21 | 0.20 |
| 1 hour | 0.22 | 0.15 |
| 2 hours | 0.23 | 0.13 |
| 3 hours | 0.23 | 0.13 |
| 4 hours | 0.23 | 0.13 |
| 5 hours | 0.23 | 0.12 |
| 6 hours | 0.24 | 0.13 |
| 7 hours | 0.27 | 0.13 |

EXAMPLE 8

Samples of base solutions having various magnesium impurity levels as exhibited by the $MgO/P_2O_5$ ratio were stored at a pH of 5.5 as shown in Table 3 and at a pH of 6.2 as shown in Table 4. It can be seen that substantially greater magnesium levels can be tolerated at the low pH.

TABLE 3

Precipitation of Magnesium from Base Solutions [1] with Different $MgO/P_2O_5$ Ratios at a pH of 5.5

| Sample: | Mg concentration, weight percent | $MgO/P_2O_5$ | Induction [2] period |
|---|---|---|---|
| 1 | 0.12 | 0.0057 | No precipitant. |
| 2 | 0.14 | .0067 | Do. |
| 3 | 0.16 | .0077 | Do. |
| 4 | 0.18 | .0086 | Do. |
| 5 | 0.20 | .0096 | Do. |
| 6 | 0.22 | .0105 | 26 days. |
| 7 | 0.24 | .0115 | 21 days. |
| 8 | 0.29 | .0139 | 4 days.[3] |
| 9 | 0.34 | 0.0163 | 14 days. |

[1] Stored at 100° F.; seeded with $Mg(NH_4)_2P_2O_7 \cdot 4H_2O$.
[2] Number of days after storage before a precipitate was observed.
[3] Sample contaminated with aluminum from lining of container lid.

TABLE 4

Precipitation of Magnesium from Base Solutions [1] with Different $MgO/P_2O_5$ Ratios at a pH of 6.2

| Sample: | Mg concentration, weight percent | $MgO/P_2O_5$ | Induction [2] period |
|---|---|---|---|
| 1 | 0.04 | 0.0020 | No precipitant. |
| 2 | 0.09 | .0045 | Do. |
| 3 | 0.11 | .0055 | Do. |
| 4 | 0.13 | .0065 | 52 days. |
| 5 | 0.15 | .0075 | 28 days. |
| 6 | 0.17 | .0085 | 21 days. |
| 7 | 0.19 | .0095 | 17 days. |
| 8 | 0.21 | .0105 | 12 days. |
| 9 | 0.23 | .0115 | 10 days. |
| 10 | 0.25 | .0125 | 7 days. |
| 11 | 0.30 | .0150 | 5 days. |
| 12 | 0.35 | 0.0175 | 4 days. |

[1] Stored at 100° F.
[2] Number of days after storage before a precipitate was observed.

Precipitation of magnesium salts such as the magnesium ammonium pyrophosphate tetrahydrate is also inhibited at pH values below about 5.0 as shown for instance by Example 1, but this value is presently preferred as an approximate lower limit because of corrosivity and product hydrolysis considerations.

Having thus described the invention by providing specific examples thereof, it is to be understood that no undue limitations or restrictions are to be drawn by reason thereof and that many variations and modifications are within the scope of the invention.

What is claimed is:

1. The method of preparing a fertilizer base solution of reduced magnesium salt content from wet process superphosphoric acid containing magnesium salt impurities which comprises ammoniating said acid to a pH within the range of about 6.0 to about 6.2, and then adjusting the pH to within the range of about 5.0 to about 5.6 by addition thereto of concentrated nitric acid.

References Cited

UNITED STATES PATENTS

| 2,950,961 | 8/1960 | Striplin et al. | 71—42 |
| 3,015,552 | 1/1962 | Striplin et al. | 71—43 X |
| 3,057,711 | 10/1962 | Reusser et al. | 71—43 |
| 3,243,279 | 3/1966 | Young | 71—43 |
| 3,290,140 | 12/1966 | Young | 71—34 |

SAMIH N. ZAHARNA, Primary Examiner

B. H. LEVENSON, Assistant Examiner

U.S. Cl. X.R.

71—39, 42